United States Patent [19] [11] 4,191,806
Levy [45] Mar. 4, 1980

[54] PRESSURE VENT FOR A SEALED PRIMARY CELL

[75] Inventor: Isaac I. Levy, Cambridge, Wis.

[73] Assignee: ESB Incorporated, Philadelphia, Pa.

[21] Appl. No.: 937,505

[22] Filed: Aug. 28, 1978

[51] Int. Cl.² .................................................. H01M 2/12
[52] U.S. Cl. ........................................ 429/56; 429/122; 220/203
[58] Field of Search ........................ 429/56, 53–54, 429/72, 82, 163–165, 171, 174, 185, 122; 220/203, 209

[56] References Cited

U.S. PATENT DOCUMENTS

| | | | |
|---|---|---|---|
| 2,203,902 | 6/1940 | Georgiev | 429/56 X |
| 3,218,197 | 11/1965 | Carmichael et al. | 429/56 |
| 3,401,314 | 9/1968 | Steele, Jr. | 429/56 |
| 4,075,398 | 2/1978 | Levy | 429/56 |

Primary Examiner—Anthony Skapars
Attorney, Agent, or Firm—Gilbert W. Rudman; Anthony J. Rossi; Gary V. Pack

[57] ABSTRACT

A disc formed of a resilient plastic exhibiting a low creep characteristic and having a pressure vent is used to close the mouth of a tubular cell envelope of a primary cell. An elongated terminal is inserted through the disc and into the cell interior. The pressure vent is in the disc at a location between the terminal and the edge of the disc. The vent comprises a recess having a frangible diaphragm with at least one groove. At a predetermined pressure the diaphragm breaks at the groove, releasing pressure.

8 Claims, 7 Drawing Figures

PRESSURE VENT FOR A SEALED PRIMARY CELL

BACKGROUND OF THE INVENTION

1. Field of the Invention

The present invention relates to primary cells and more particularly to an improved means for venting sealed primary cells when incordinate pressure is generated therein.

2. Prior Art

A common type of seal primary cell comprises a relatively deep, tubular envelope, usually drawn from metal, and a separate cover and/or disc which is used to close the envelope after the latter is filled with electrolyte, separators, and other materials depending upon the nature of the cell. Both LeClanche and alkaline cells have been formed in this manner. Although such cells have been produced in a vast array of shapes and sizes, perhaps the most common type of cell constitute the relatively small, cylindrical cell often broadly termed a "flashlight battery". Of course, primary cells are used in countless other types of apparatus, and are formed in many different sizes and capacities.

The construction of such cells is far from simple, and must meet exacting demands with respect to both insulating and sealing capacity. In particular, the cell construction must not only be economical, but must be liquid-tight to prevent the escape of the cell contents.

Generally speaking, a sealed primary cell will theoretically operate at a relatively low internal pressure, which seldom exceeds approximately ½ atmospheres (absolute). In use, however, this figure is often exceeded. One particularly common cause of severe overpressure is the inadvertent reversal of a cell in an application wherein it is series-connected with two or more other cells. In such a case, the potential of the correctly aligned cell overcomes that of the reversed cell and causes the reversed cell to charge rapidly. The cell electrolyte then "outgases", gas being developed much more rapidly than it can be reabsorbed by the cell contents. As a result pressure rapidly builds up within the cell and, if not relieved, may cause the cell to burst, dispersing the cell electrolyte and possibly damaging the enclosure in which the cells are disposed.

For the foregoing reasons, it has become commonplace to provide venting or pressure relief mechanisms in sealed cells. Such venting mechanisms ordinarily allow gas to escape from the cell under overpressure conditions along a predetermined path, and are intended to relieve gas pressure before the cell bursts. While in principal the provision of a pressure relief vent is straightforward, due to the small size and relatively low price of the more popular size cells, the design of appropriate venting mechanisms is difficult.

Basically, three types of venting systems have evolved for use in sealed cells. With one approach, a spring loaded valve is provided, the valve being biased by the spring with a pressure which is overcome during outgasing conditions, temporarily opening the valve against the pressure of the spring. With another approach, a venting passageway is covered by a resilient member, such as a plastic washer. The resilient member can be temporarily deformed by excess pressure in the cell, forcing it away from the venting opening and allowing the gas to escape from within the cell.

Finally, a currently popular approach with small size sealed cells is providing a weakened section or diaphragm which is ruptured by unduly high pressure within the cell. In one version of this approach the diaphragm is simply stretched to the bursting point by internal pressure; in another, the diaphragm is urged outwardly against a point anvil or the like which punctures the diaphragm allowing the pent-up gases to escape. The latter two approaches have found favorite with manufacturers of sealed cells due at least in part to their simplicity which allows them to be easily miniaturized for use with smaller cells.

One of the reasons of the popularity of the diaphragm venting system is that it can be injection molded in one piece in one operation and then placed into the cell. However, there are problems in using the diaphragm of the prior art in that the newer harder plastics cannot be injection molded to form a diaphragm thin enough to burst at the pressure required in a sealed primary cell and once the diaphragm is burst, it cannot be resealed and the contents of the cell can leak.

Accordingly, it would be highly desirable to be able to provide a diaphragm venting system in which the disc could be made of a newer harder plastic, which improve the characteristics of cell, and still be injection molded.

It also would be highly desirable to provide a diaphragm type venting system in which the diaphragm could, at least in the lower range of high pressure situations, readily release the excess gas and then be resealed, preventing leakage, but which would be capable under excessive high pressure to burst fully and provide a safe cell.

SUMMARY OF THE INVENTION

A sealed primary cell is provided which has a generally tubular envelope having a mouth at one end thereof, a mass of electrolyte disposed in the envelope, a disc having an inner and outer surface and extending across the mouth of the envelope to seal the interior of the envelope, an outer cap assembly disposed over the disc, and terminal means extending through the disc and into the electrolyte; wherein the disc is formed of a plastic resistant to attack by the electrolyte and has a recess with a diaphragm having at least one groove.

In a preferred embodiment of the current invention, the diaphragm has at least two radial grooves. At a predetermined pressure, the diaphragm breaks at the grooves, forming flaps, the pressure forces the flaps outward and the pressure is released. After the pressure is released, the flaps return substantially to their original position, and hence, prevent leakage of cell contents.

BRIEF DESCRIPTION OF THE DRAWINGS

While the specification concludes with claims particularly pointing out and distinctly claiming the subject matter which is regarded as the invention, it is believed that the invention would be better understood from the following description of a preferred embodiment taking in conjunction with the accompanying drawings in which:

DESCRIPTION OF A PREFERRED EMBODIMENT

Figure 1:
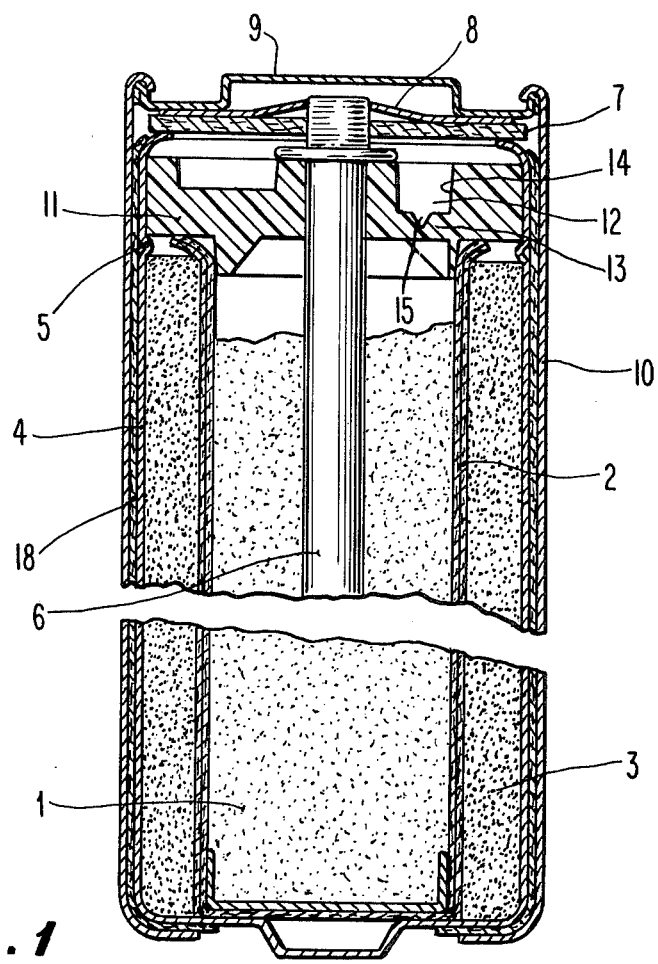
FIG. 1 is a cross-sectional diagram of a sealed primary cell of the alkaline type utilizing the teachings of the present invention.

The cell illustrated in FIG. 1 comprises a centrally located gelled electrolyte mix 1 surrounded by a separator 2. Disposed concentrically outside the separator is a second mix 3, commonly formed of manganese dioxide or the like. The envelope is conductive, and serves to form the positive electrode of the cell, while a centrally-disposed electrode termed a "nail" forms the inner portion of the negative electrode.

The cell depicted is intended to represent a primary galvanic cell of the "D" size. Such cells are conventially formed in the shape of a right cylinder, envelope 4 comprising a deep-drawn cylindrical steel tube having an open end or a mouth into which the various mixes, separators, and the like are placed during manufacture of the cell. The mouth of the cell is closed by a generally planar disc 11 which seats upon identations 5 whose primary function is the proper actual location of the disc. The upper end of nail 6 terminates in a flange seated across the upper surface of disc 11. Placed over the flange is an annular paper washer 7 which constitutes an insulator for separating the cell envelope from other, conductive members which constitute the outer can assembly. Finally, surmounting washer 7 is a metal strip 8 having an aperture in the middle, the edges of the aperture being upset to form resilient teeth which, upon being forced over the head of nail 6, grip the head tightly to hold the assembled components in place and further forms a conductive path from the head of nail 6 to an outer cap 9. The outer cap then forms the negative terminal of the cell.

An outer covering 10 is disposed about the lateral area of the envelope and is spaced therefrom by an insulative sleeve 18 which may, for instance, be a paper or the like. The upper ends of sleeve 18 are crimped over the periphery of outer cap 9, and about the planar bottom of envelope 4, to firmly fasten the cell elements together.

In order to afford pressure relief to the interior of the cell, disc 11 is provided with a recess generally indicated at 12. Placed across this recess is diaphragm 13 substantially as shown. The perimeter of the recess is defined by wall 14. The diaphragm has at least one groove 15.

Figure 2:
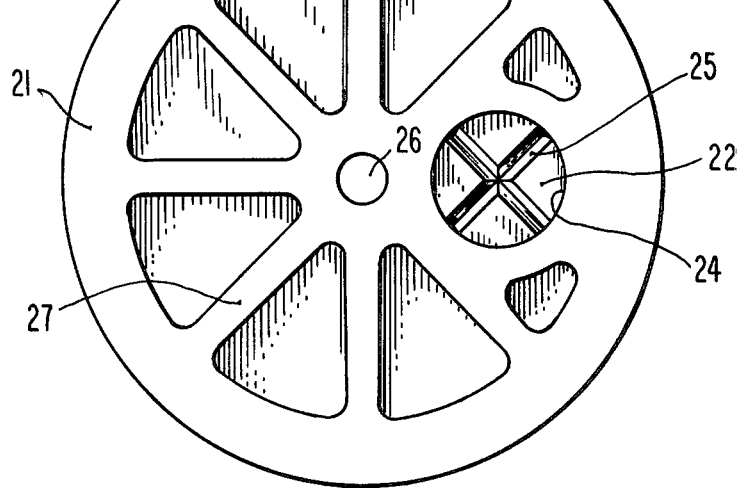
FIG. 2 illustrates a disc of the current invention.
Figure 3:
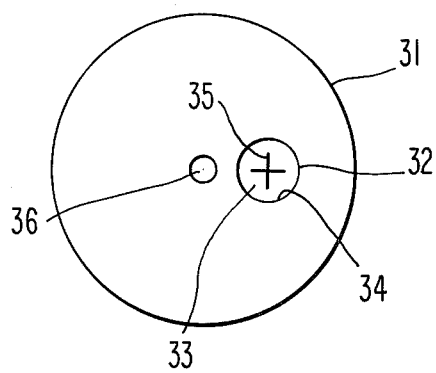
FIG. 3 illustrates a disc of the current invention.
Figure 4:
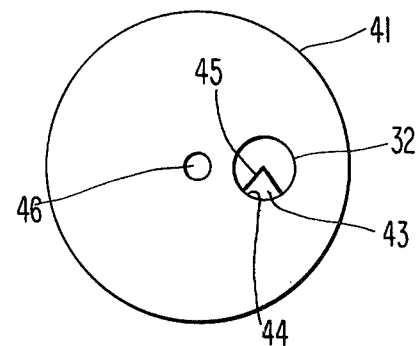
FIG. 4 illustrates a disc of the current invention.
Figure 5:
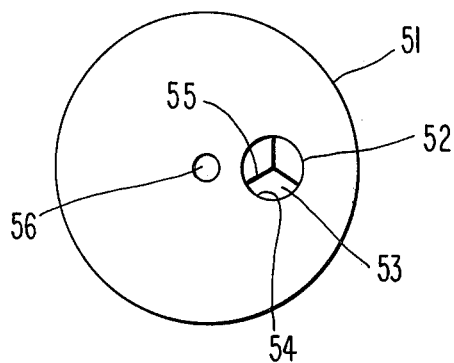
FIG. 5 illustrates a disc of the current invention.
Figure 6:
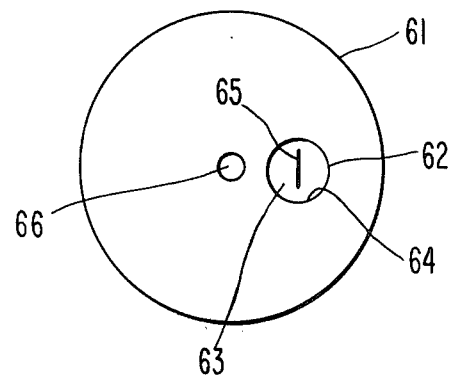
FIG. 6 illustrates a disc of the current invention.
Figure 7:
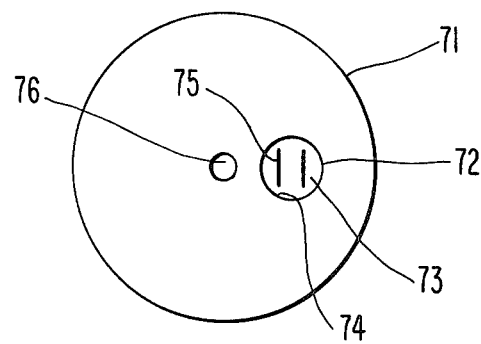
FIG. 7 illustrates a disc of the current invention.

FIG. 2 illustrates a preferred embodiment of the disc. Disc 21 has a centerally-located aperature 26 through which a "nail" is subsequently urged. Radial ribs 27 are utilized to increase the radial strength of the disc. Recess 22 is located between two radial ribs and between aperature 26 and the periphery of the disc. Wall 24 defines the perimeter of the recess. Diaphragm is a membrane across the recess. V-shaped tapered radial grooves 25 are within the diaphragm.

When an inordinate amount of pressure is generated within the cell by outgasing of the electrode, due to rapid charge in the cell or other circumstances the pressure will cause rupturing of the diaphragm at the radial grooves and the pressure will be released. If the excess pressure is minimal, flaps formed in the preferred embodiment by the rupturing at the grooves, will return to their original position, reforming the diaphragm. The break between the flaps will be insufficient to allow leakage of the cell contents.

FIGS. 3 through 7 illustrate other embodiments of the invention. In all the Figures, Disc 31, 41, 51, 61 and 71 have a centrally-located aperature 36, 46, 56, 66 and 76 through which a "nail" is subsequently urged. Recess 32, 52, 62 and 72 are between aperature 36, 46, 56, 66 and 76 and the periphery of the disc. Diaphragm 33, 43, 53, 63 and 73 are membranes across the recess. Groove 35, 45, 55, 65 and 75 are within the diaphragm.

The disc may be formed of any suitably substantially rigid material, such as thermosetting or thermoplastic resins, which is resilient and is unaffected by the nature of the elements of the electrical device. It has been determined that several materials will fill this criteria. These material include polysulfone (such as Udel P1700), polyphenylene oxide (such as Noryl), polyamides (such as Nylon 1001L), polypropylene, polyethylene, polystyrene, acrylonitrile-butadiene-styrene (ABS), and the like. These materials may be filled with glass. Preferably, the material will be ABS, polyamide, polyphenylene oxide, or polypropylene. The most preferred materials are polyphenylene oxide and polypropylene.

The amount of pressure required to rupture the disc at the groove can be adjusted to provide venting at a desired predetermined point over a range of approximately 50 to 700 pounds per square inch as required in the wide variety of cells needing venting. Preferably, the rupturing range will be from 100 to 350 pounds per square inch, and more preferably 250 to 350 pounds per square inch.

To achieve rupturing at the desired venting pressure, different dimensional requirements are needed for discs made from different materials. However, when polyphenylene oxide is used, as in a preferred embodiment as shown in FIG. 2, the thickness of the diaphragm should be between 0.010 and 0.020 inches. The diaphragm of FIG. 2 has a thickness of 0.015 inches.

The groove of the disc, whatever material is used, is preferably tapered in a V shape. The panel thickness at the base of the groove should be $\frac{1}{3}$ to $\frac{2}{3}$ of the thickness of the diaphragm.

The width of the groove should be from 1 to 4 times the thickness of the diaphragm. Preferably, it will be 1.5 to 2.5 times the thickness of the diaphragm.

The length of the groove can vary. It is preferred that the end of the groove does not abutt the wall of the recess.

The disc is formed by injection molding. In the prior art it was found when the harder plastics were used that diaphragms having sufficient thinness to burst at the desired pressure levels could not be made in one molding step. The placing of the grooves in the diaphragm allows the diaphragm to have a sufficient thickness to be injection molded in one step and still be rupturable at the desired pressure. The grooves are produced during injection molding of the disc by merely allowing molding material to flow into that part of the mold.

While a disc formed of a newer harder plastic merely requires one groove to enable venting at the pressure required in a sealed primary cell, it has been found that a preferred disc having a diaphragm with more than one radial groove is capable of resealing the cell.

The disc of FIGS. 2, 3, 4, and 5 are examples of such a preferred disc. The diaphragm of these discs, upon rupturing, form flaps. The relatively thick flaps spring back to substantially their original positions after releasing the pressure, hence, not allowing leakage of the cell contents. If the pressure within the cell again becomes excessive, the process can again be vented.

EXAMPLE 1

A plastic disc formed of polyphenylene oxide (Noryl sold by the GE Corporation) was injection molded to the form of the disc of FIG. 2. It was intended for use as part of a cell top in an alkaline "C" cell. The recess was 0.100 inches in radius, the diaphragm was 0.015 inches thick, and the grooves were radial, V-shaped tapered to 0.005 inches and had a width of 0.03 inches. The discs were tested to determine their venting pressure. The following table shows that while the pressure needed for venting decreased in subsequent tests, the required pressure was still sufficiently high to prevent leakage.

TABLE 1

| Disc | First Test lb./sq.in. Required For Venting | Second Test lb./sq.in. Required For Reventing |
| --- | --- | --- |
| 1 | 310 | 270 |
| 2 | 250 | 210 |
| 3 | 340 | 300 |
| 4 | 300 | 270 |
| 5 | 350 | 270 |
| 6 | 270 | 250 |
| 7 | 280 | 330 |
| 8 | 370 | 330 |
| 9 | 330 | 300 |
| 10 | 410 | 370 |
| 11 | 390 | 280 |
| 12 | 220 | 210 |
| 13 | 410 | 370 |
| 14 | 250 | 220 |
| 15 | 270 | 250 |
| 16 | 280 | 260 |
| 17 | 340 | 280 |

EXAMPLE 2

A plastic disc formed of polyphenylene oxide was injection molded to the form of the disc of FIG. 2. It was intended for use as part of a cell top in an alkaline "C" cell. The recess was 0.200 inches in diameter. The diaphragm was 0.015 inches thick. The grooves were radial, V-shaped, tapered to 0.005 inches panel thickness, 0.030 inches wide and 0.180 inches long. The discs were tested to determine their venting and reventing pressures. The venting pressures are expressed in pounds per square inch. Test 1 was the pressures at which the disc first vented. Tests 2–11 are the pressures required for subsequent reventing.

TABLE 2

| Test | Disc 1 | Disc 2 | Disc 3 |
| --- | --- | --- | --- |
| 1 | 270/280 | 260/260 | 260/270 |
| 2 | 200/210 | 120/130 | 230/250 |
| 3 | 200/210 | 120/130 | 230/250 |
| 4 | 190/210 | 110/120 | 230/250 |
| 5 | 190/210 | 100/120 | 230/250 |
| 6 | 190/210 | 100/120 | 230/250 |
| 7 | 190/210 | 100/120 | 220/240 |
| 8 | 190/210 | 100/120 | 220/240 |
| 9 | 190/210 | 100/120 | 220/240 |
| 10 | 190/210 | 100/120 | 220/240 |
| 11 | 190/210 | 100/120 | 220/240 |

I claim:

1. A sealed primary cell comprising
   a generally tubular envelope having a mouth at one end thereof;
   a mass of electrolyte disposed in the envelope;
   a disc having an inner and outer surface and extending across the mouth of the envelope to seal the interior of the envelope;
   an outer cap assembly disposed over the disc; and
   a terminal means extending through the disc and into the electrolyte;
   wherein the disc is formed of polysulfone, polyphenylene oxide, polyamides, polypropylene, polyethylene, polystyrene or acrylonitrile-butadiene-styrene and has a recess, the recess defined by a wall and a diaphragm; said diaphragm having at least two radial grooves.

2. The cell of claim 1 wherin the grooves have a panel thickness of ⅓ to ⅔ of the thickness of the diaphragm and a width at their widest point of 1 to 4 times the thickness of the diaphragm.

3. The primary cell of claim 1 wherein the disc is formed of acrylonitrile-butadiene-styrene, polyamide, polyphenylene oxide, or polypropylene.

4. A sealed primary cell comprising
   a generally tubular envelope having a mouth at one end thereof;
   a mass of electrolyte disposed in the envelope;
   a disc having an inner and outer surface and extending across the mouth of the envelope to seal the interior of the envelope;
   an outer cap assembly disposed over the disc;
   and terminal means extending through the disc and into the electrolyte;
   wherein the disc is formed of polyphenylene oxide or polypropylene and has a recess, the recess defined by a wall and a diaphragm; said diaphragm having at least two radial grooves, a panel thickness of ⅓ to ⅔ of the thickness of the diaphragm and a width at the widest point of 1 to 4 times the thickness of the diaphragm, and wherein the diaphragm has a thickness of 0.010 to 0.020 inches.

5. The cell of claim 4 wherein the disc is formed of polyphenylene oxide.

6. A disc for use in a sealed primary cell wherein the disc is formed of polysulfone, polyphenylene oxide, polyamides, polypropylene, polyethylene, polystyrene, acrylonitrile-butadiene-styrene and has a recess, the recess being defined by a wall and a diaphragm;
   the diaphragm having at least two radial grooves and the grooves do not abutt the wall.

7. The disc of claim 6 wherein the disc is formed of polyphenylene oxide or polypropylene.

8. The disc of claim 7 wherein said grooves have a panel thickness of ⅓ to ⅔ of the thickness of the diaphragm and a width at its widest point of 1 to 4 times the thickness of the diaphragm.

* * * * *